(12) United States Patent
Pfleger, Jr.

(10) Patent No.: US 9,830,190 B1
(45) Date of Patent: Nov. 28, 2017

(54) MAINTAINING REPOSITORY OF VIRTUAL MACHINE STATE INFORMATION

(71) Applicant: CA, Inc., Islandia, NY (US)

(72) Inventor: George James Pfleger, Jr., Scottsdale, AZ (US)

(73) Assignee: CA, Inc., New York, NY (US)

( * ) Notice: Subject to any disclaimer, the term of this patent is extended or adjusted under 35 U.S.C. 154(b) by 159 days.

(21) Appl. No.: 14/193,847

(22) Filed: Feb. 28, 2014

(51) Int. Cl.
*G06F 15/173* (2006.01)
*G06F 9/50* (2006.01)
*H04L 29/08* (2006.01)

(52) U.S. Cl.
CPC ........ *G06F 9/5016* (2013.01); *H04L 67/1014* (2013.01)

(58) Field of Classification Search
CPC .................................... G06F 9/46; G06F 9/44
USPC .......................................... 709/226; 717/172
See application file for complete search history.

(56) References Cited

U.S. PATENT DOCUMENTS

| | | | | |
|---|---|---|---|---|
| 2004/0030880 | A1* | 2/2004 | Kitagawa | G06F 9/4411 713/1 |
| 2009/0138869 | A1* | 5/2009 | Fitzgerald | G06F 8/60 717/172 |
| 2009/0235250 | A1* | 9/2009 | Takai | G06F 8/60 718/1 |
| 2010/0128432 | A1* | 5/2010 | Miller | H05K 7/20836 361/679.54 |
| 2010/0205303 | A1* | 8/2010 | Chaturvedi | G06F 21/126 709/226 |
| 2010/0325727 | A1* | 12/2010 | Neystadt | G06F 21/53 726/22 |
| 2011/0010383 | A1* | 1/2011 | Thompson | H04L 41/0213 707/769 |
| 2012/0167094 | A1* | 6/2012 | Suit | G06F 11/3452 718/100 |
| 2012/0239831 | A1* | 9/2012 | Ueno | G06F 13/00 710/33 |
| 2012/0331462 | A1* | 12/2012 | Falko | G06F 9/45533 718/1 |
| 2013/0232484 | A1* | 9/2013 | Chieu | G06F 9/45558 718/1 |
| 2014/0047442 | A1* | 2/2014 | Burckart | G06F 9/5077 718/1 |
| 2014/0089921 | A1* | 3/2014 | Yang | G06F 9/45558 718/1 |

(Continued)

*Primary Examiner* — Nicholas Taylor
*Assistant Examiner* — Meng Vang
(74) *Attorney, Agent, or Firm* — Coats & Bennett, PLLC

(57) ABSTRACT

According to an example computer-implemented method, an autonomous transmission of an updated data set of state information for a virtual machine (VM) is received at a web server. The state information includes configuration data for the VM. A most recent previous data set of state information for the VM is obtained from a repository of historical data sets of state information for the VM. A determination is made of which fields of the updated data set of state information have changed from the most recent previous data set of state information. The updated data set is stored in the repository of historical data sets. The updated data set of state information and an indication of which fields in the updated data set have changed from the most recent previous data set are transmitted to a destination.

20 Claims, 11 Drawing Sheets

(56) References Cited

U.S. PATENT DOCUMENTS

2014/0130046 A1* 5/2014 Okuno ................ G06F 9/45533
 718/1
2015/0177997 A1* 6/2015 Warszawski .......... G06F 3/0617
 711/162

* cited by examiner

CONFIGURATION DATA

| | | | |
|---|---|---|---|
| 42 — CPU QUANTITY | 2 | | |
| 44 — CPU SPEED | 3.4 GHz | | |
| 46 — VM RAM | 4 GB | | |
| 48 — VM HARD DRIVES | 50 — | MOUNT POINT | C: |
| | 52 — | SIZE | 30 GB |
| | 54 — | PROVISIONING METHOD | THICK |
| | 56 — | IMAGE LOCATION | /Datatore1/MyVMDiskC.vmdk |
| | | MOUNT POINT | D: |
| | | SIZE | 60 GB |
| | | PROVISIONING METHOD | THIN |
| | | IMAGE LOCATION | /Datatore1/MyVMDiskD.vmdk |
| 58 — VM OTHER DRIVES | 60 — | MOUNT POINT | E: |
| | 62 — | TYPE | DVD-ROM |
| | 64 — | IMAGE LOCATION | /Datatore2/MyDVDImage.iso |
| 66 — VM NETWORKS | 68 — | INTERFACE | ETHERNET 0 |
| | 70 — | SPEED | 10Gbps |
| | 72 — | IP ADDRESS | 192.168.100.14 |
| | 74 — | NETWORK | MyCo-Network-A |

| | INTERFACE | ETHERNET 1 |
| --- | --- | --- |
| | SPEED | 10Gbps |
| | IP ADDRESS | 10.10.20.22 |
| | NETWORK | MyCo-Network-B |
| 76 — VM POWER STATUS | SUSPENDED | |
| 78 — VM SNAPSHOTS | 80 — NAME | PRE-INSTALL |
| | 82 — DESCRIPTION | PRIOR TO APPLICATION INSTALL |
| | 84 — CREATED | 2014-02-11 14:02:53 |
| | 86 — INCLUDES RAM? | NO |
| 88 — VM HYPERVISOR | US-EAST-1 | |
| 90 — VM PREFERRED HYPERVISOR | US-EAST-1, US-EAST-2, US-WEST-1 | |

METADATA

| 92 — VM NAME | WEB STREAMING SERVER |
| --- | --- |
| 94 — VM DESCRIPTION | VM FOR STREAMING MULTIMEDIA CONTENT TO END USERS |
| 96 — VM GUEST OS | WINDOWS |
| 98 — VM GUEST OS VERSION | WINDOWS 7 SP1 |

FIG. 3B

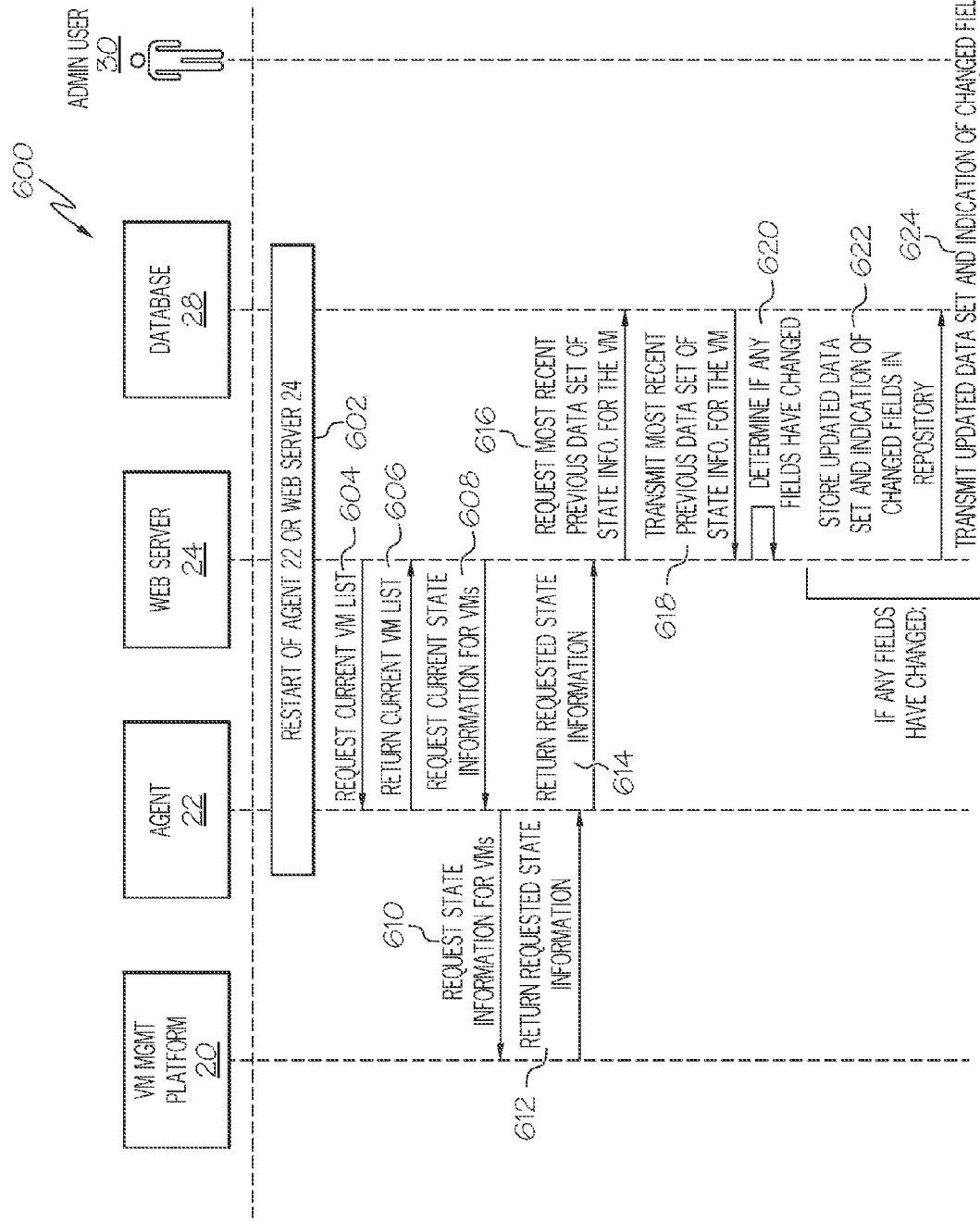

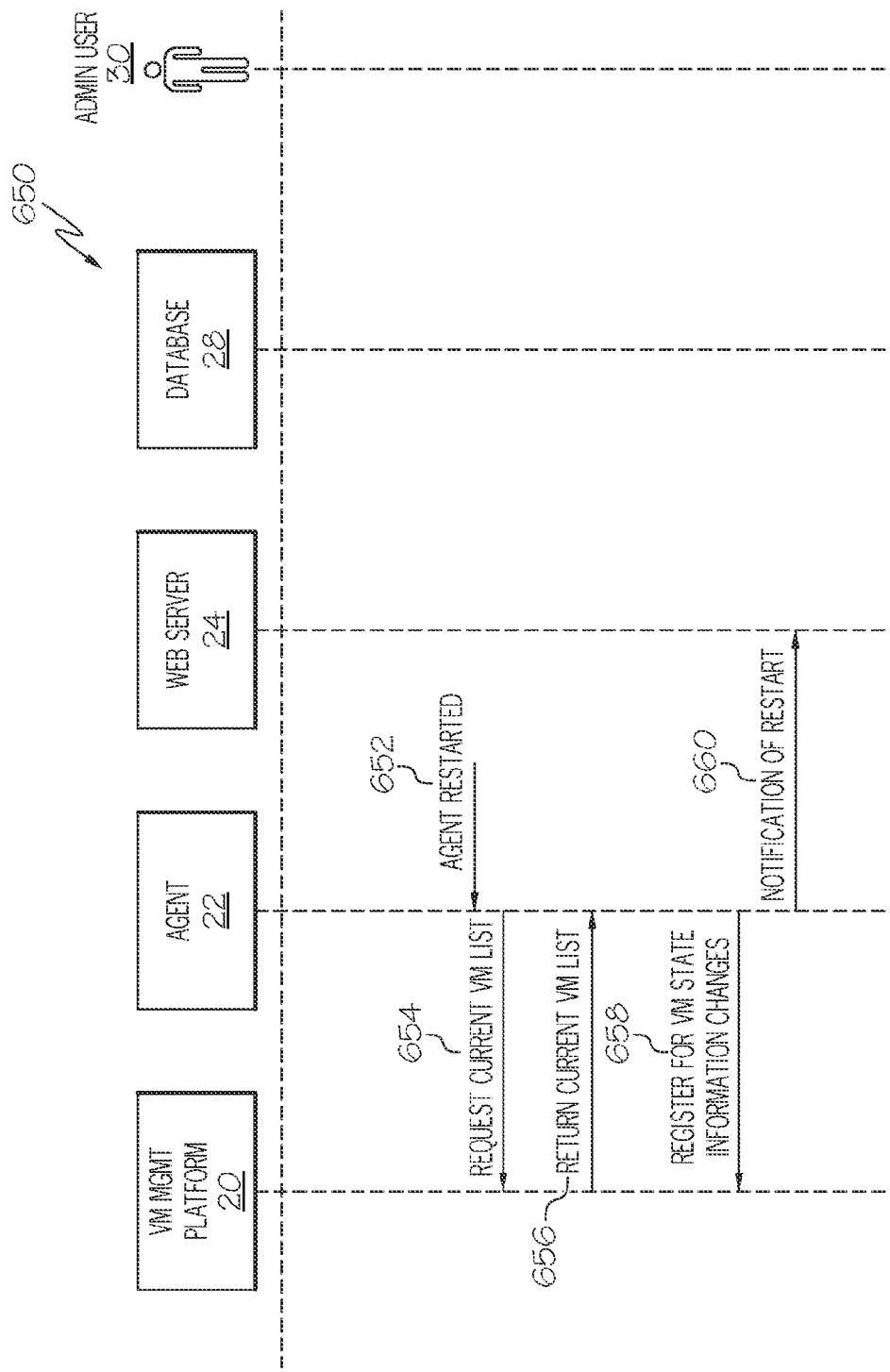

US 9,830,190 B1

MAINTAINING REPOSITORY OF VIRTUAL MACHINE STATE INFORMATION

TECHNICAL FIELD

The present disclosure relates to virtual machines, and more particularly relates to maintaining a repository of historical state information for a virtual machine.

BACKGROUND

Computer virtualization has proven to be very valuable in many information technology (IT) scenarios. By using virtualization, a computer running a base operating system (e.g., MICROSOFT WINDOWS) can run the same or another "guest" operating system on top of the base operating system in a virtual environment (e.g., LINUX). Virtualization tools offer a number of beneficial features. For example, virtualization can be quite useful in quality assurance (QA) testing where it may be desirable to test a certain program in a variety of operating system environments. A QA engineer can create a virtual machine (VM) for each desired operating system, and can test their application in each of those guest operating systems without ever changing the base operating system that runs on a computing device.

Virtualization can also be quite useful in server environments. For example, if a VM is used as an email server, and the physical server running the VM suffers a hardware failure, the email server VM image can be quickly launched on another physical server in a very short period of time while the hardware failure is analyzed, to minimize downtime.

Virtualization has also proven to be quite useful for large companies, such as NETFLIX, who have a great deal of multimedia content to be streamed over the Internet, but do not want to concern themselves with the burden of maintaining large numbers of servers for streaming. Services, such as "Amazon Web Services" (AWS) from AMAZON.COM have proven to be quite useful for customers of all sizes. By using AWS, a "tenant" can simply select how many VMs are desired from AMAZON, and how much computing resources are needed for each VM (e.g., CPUs, memory, etc.), and those VMs are then provided without the tenant ever knowing the details of the backend hardware supporting their VMs. While AWS runs as a service on AMAZON-hosted servers, other virtualization products can provide virtualization on an organization's own hardware. Some example virtualization products along these lines include VCENTER from VMWARE, XENSERVER from CITRIX, and HYPER-V from MICROSOFT.

The VMs of an organization may need to be occasionally audited. This may be required for Sarbanes-Oxley (SOX) or Payment Card Industry (PCI) compliance auditing, for example. Such audits may require knowledge of what access restrictions were enforced for VMs housing sensitive information (e.g., credit card information), and/or may require information regarding specific attributes of certain VMs at a given point in time.

SUMMARY

According to one aspect of the present disclosure, a computer-implemented method is disclosed in which a web server receives an autonomous transmission of an updated data set of state information for a virtual machine, wherein the state information includes configuration data for the virtual machine. A most recent previous data set of state information for the virtual machine is obtained from a repository of historical data sets of state information for the virtual machine. A determination is made of which fields of the updated data set of state information have changed from the most recent previous data set of state information. The updated data set is stored in the repository of historical data sets. The updated data set of state information and an indication of which fields in the updated data set have changed from the most recent previous data set is transmitted to a destination.

According to another aspect of the present disclosure, a computer-implemented method is disclosed in which an updated data set of state information for a virtual machine is received from a virtual machine management platform or virtual machine server. The state information includes configuration data for the virtual machine. The updated data set is autonomously transmitted to a web server that maintains a repository of historical data sets of state information for the virtual machine. If a connection to the web server is lost and the autonomously transmission fails, updated data sets of state information for the virtual machine are accumulated as they are received from the virtual machine management platform or virtual machine server, and the accumulated data sets of state information for the virtual machine are transmitted to the web server once the connection is restored.

According to another aspect of the present disclosure, a computing device is disclosed that includes a communication interface circuit and a processing circuit in a web server. The processing circuit is configured to receive, via the communication interface circuit, an autonomous transmission of an updated data set of state information for a virtual machine, wherein the state information includes configuration data for the virtual machine. The processing circuit is configured to obtain a most recent previous data set of state information for the virtual machine from a repository of historical data sets of state information for the virtual machine. The processing circuit is also configured to determine which fields of the updated data set of state information have changed from the most recent previous data set of state information. The processing circuit is configured to store the updated data set in the repository of historical data sets of state information for the virtual machine. The processing circuit is also configured to transmit the updated data set of state information and an indication of which fields in the updated data set have changed from the most recent previous data set to a destination.

According to another aspect of the present disclosure, a computing device is disclosed which includes a communication interface circuit and a processing circuit. The processing circuit is configured to receive, from a virtual machine management platform or virtual machine server, an updated data set of state information for a virtual machine. The state information includes configuration data for the virtual machine. The processing circuit is configured to autonomously transmit, via the communication interface circuit, the updated data set to a web server that maintains a repository of historical data sets of state information for the virtual machine. The processing circuit is configured to, if a connection to the web server is lost and the autonomous transmission fails, accumulate updated data sets of state information for the virtual machine as they are received from the virtual machine management platform or virtual machine server, and transmit the accumulated data sets of state information for the virtual machine to the web server once the connection is restored.

According to another aspect of the present disclosure, a computer program product is disclosed which includes a computer readable storage medium having computer readable program code embodied therewith. The computer readable program code comprises computer readable program code configured to receive, at a web server, an autonomous transmission of an updated data set of state information for a virtual machine. The state information includes configuration data for the virtual machine. The computer readable program code further comprises computer readable program code configured to obtain a most recent previous data set of state information for the virtual machine from a repository of historical data sets of state information for the virtual machine. The computer readable program code further comprises computer readable program code configured to determine which fields of the updated data set of state information have changed from the most recent previous data set of state information, and computer readable program code configured to store the updated data set in the repository of historical data. The computer readable program code further comprises computer readable program code configured to transmit the updated data set of state information and an indication of which fields in the updated data set have changed from the most recent previous data set to a destination.

According to another aspect of the present disclosure, a computer program product is disclosed which includes a computer readable storage medium having computer readable program code embodied therewith. The computer readable program code comprising computer readable program code configured to receive, from a virtual machine management platform or virtual machine server, an updated data set of state information for a virtual machine. The state information includes configuration data for the virtual machine. The computer readable program code further comprises computer readable program code configured to autonomously transmit the updated data set to a web server that maintains a repository of historical data sets of state information for the virtual machine. The computer readable program code further comprises computer readable program code configured to, if a connection to the web server is lost and the autonomous transmission fails: accumulate updated data sets of state information for the virtual machine as they are received from the virtual machine management platform or virtual machine server; and transmit the accumulated data sets of state information for the virtual machine to a destination.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

Aspects of the present disclosure are illustrated by way of example and are not limited by the accompanying figures with like references indicating like elements.

FIGS. 3A-B illustrate example state information for a virtual machine.

FIG. 8 is a signaling diagram illustrating a process for handling a restart of the agent or the web server of FIG. 1.

FIG. 9 is a signaling diagram illustrating an example restart procedure for the agent of FIG. 1.

DETAILED DESCRIPTION

Figure 1:
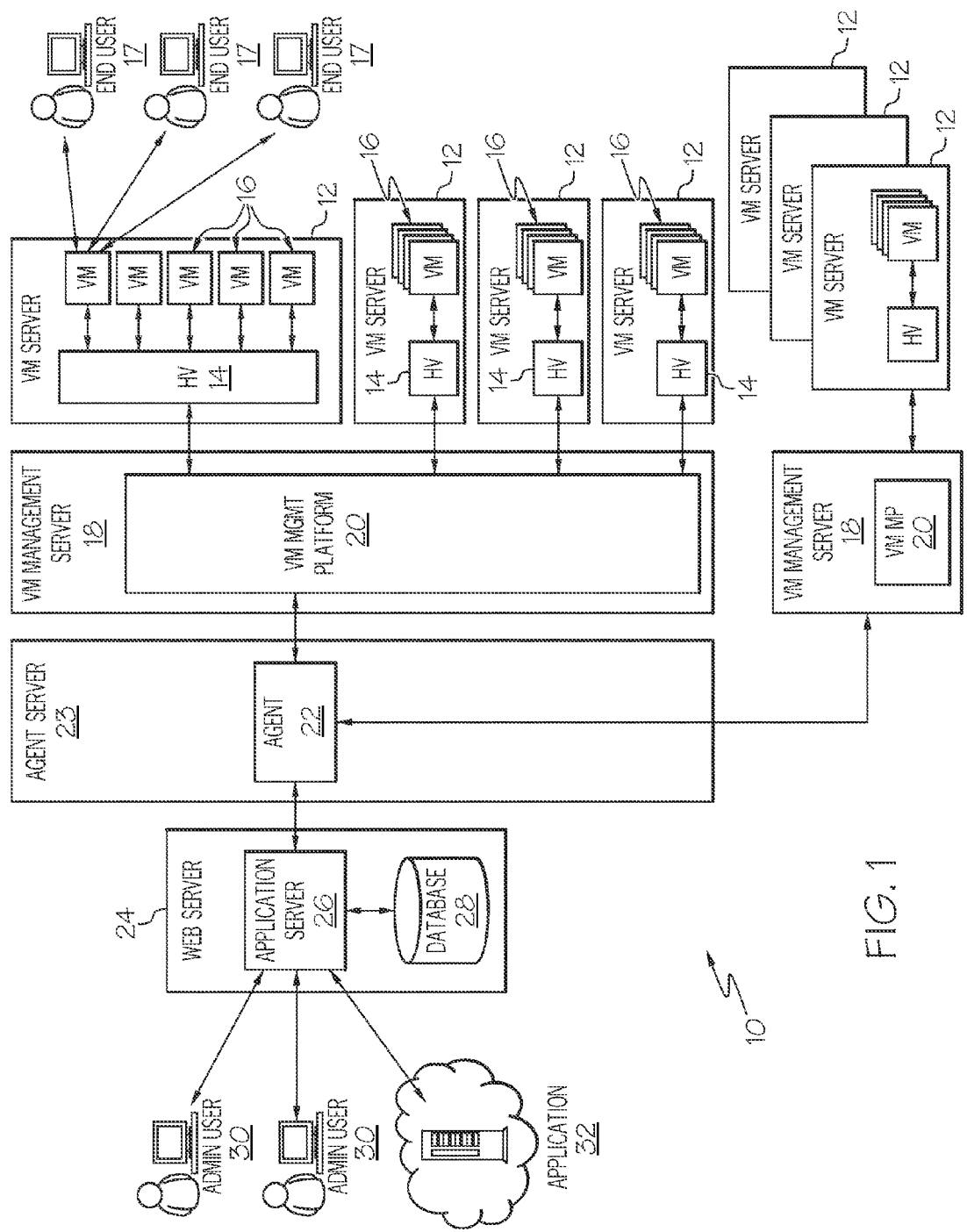
FIG. 1 illustrates an example system for supporting virtual machines and maintaining a repository of state information for a plurality of virtual machines.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure describes a system that maintains a repository of historical state information for virtual machines (VMs). A web server maintains a repository of historical data sets of state information (e.g., configuration data and metadata) for one or more VMs. The repository includes state information for previous configurations of the one or more VMs. Updated state information for the one or more VMs is received autonomously, without requiring polling by the web server. As discussed below in greater detail, the repository could be useful for both VM administrative users (e.g., to verify accuracy of usage-based billing) and for auditors (e.g., in performing SOX or PCI compliance auditing).

With this in mind, FIG. 1 illustrates an example system 10 for supporting a plurality of VMs and maintaining a repository of historical state information for the VMs. The system 10 includes a plurality of VM servers 12, each of which includes a hypervisor 14 and a plurality of VMs 16. As known to those of ordinary skill in the art, a hypervisor is piece of software that runs a VM. Some example hypervisors include HYPER-V from MICROSOFT, VCENTER from VMWARE, and XENSERVER from CITRIX.

End users 17 access the VMs 16, possibly with no awareness that they are accessing a VM and not a dedicated physical server. For example, the end users 17 could be communicating with the VMs 16 as part of a video streaming service, such as NETFLIX. A plurality of VM management servers 18 each support a VM management platform 20 that manages a plurality of VM servers 12. An example VM management platform 20 includes VCENTER SERVER from VMWARE. An agent 22 supported by agent server 23 is in communication with a plurality of VM management platforms 20. Although two VM management platforms 20 are shown, it is understood that this is only an example, and that more or fewer VM management platforms 20 could be in communication with the agent 22.

A web server 24 includes an application server 26 and a database 28. The agent 22 transmits updated data sets of state information for the VMs 16 to the web server 24 (in particular to the application server 26 executing on the web server 24), and the database 28 acts as a repository of historical data sets of state information (e.g., configuration data and metadata) for the plurality of VMs 16. The application server 26 provides the updated data sets of state information to administrative (admin) users 30 or applications 32 authorized to view state information for certain VMs. For example, if the VM management platform 20 was a service provider (e.g., AWS) running VMs 16 for many different customers (called "tenants"), a given administrative user 30 would only be able to view state information for the VMs 16 of tenants for which they are authorized, and would be unable to view state information for the VMs 16 of other tenants. This may also be the case in an organization that hosts and supports its own VMs 16, for example. In such an organization some VMs 16 may contain non-sensitive data accessible to all admin users 30 of the organization, whereas other VMs 16 may contain sensitive data that is only accessible to a small subset of the admin users 30. One example application 32 could include a Change Management Database (CMDB) which tracks the state and configuration of every component in the inventory of an organization—both physical and virtual (e.g., VMs, laptop computers, desktop computers, servers, routers, mobile phones, etc.). Another example application 32 could include an order and billing system. Such an application could be useful to ensure that when a tenant orders a new VM, billing does not start until the billing system is notified that the VM was provisioned.

Figure 2:
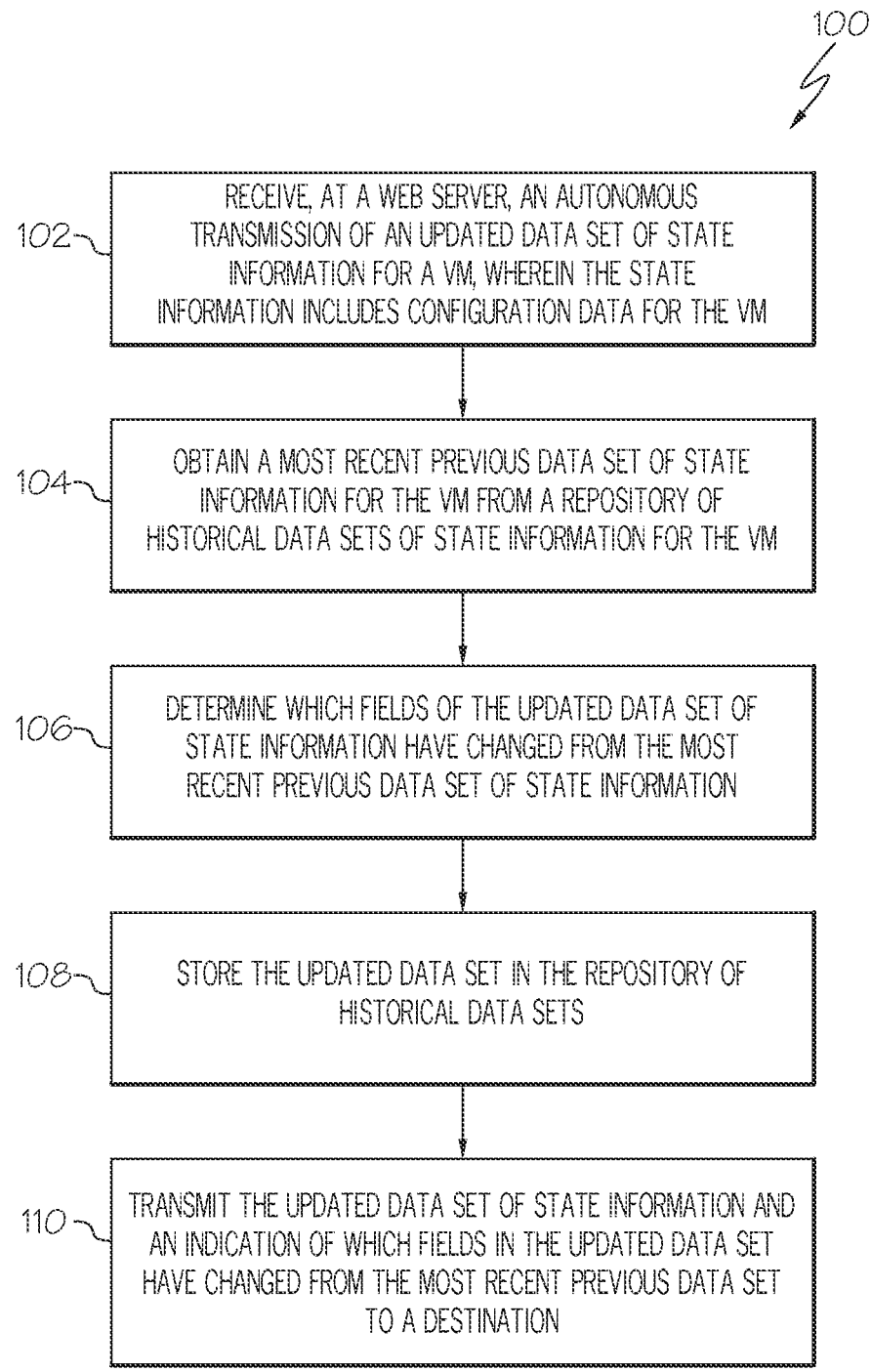
FIG. 2 illustrates an example method of handling virtual machine state information.

FIG. 2 illustrates a method 100 of handling VM state information which is implemented by web server 24. The web server 24 receives an autonomous transmission of an updated data set of state information for a VM 16 (block 102). The state information includes configuration data for the virtual machine. The transmission being autonomous indicates that the web server 24 is not required to perform polling to obtain the updated state information. To the contrary, it is autonomously transmitted to the web server 24. The web server 24 obtains a most recent previous data set of state information for the VM from a repository of historical data sets of state information for the VM (block 104) in database 28. The web server 24 determines which fields of the updated data set of state information have changed from the most recent previous data set of state information (block 106). The web server 24 stores the updated data set in the repository of historical data sets (block 108), and transmits the updated data set of state information and an indication of which fields in the updated data set have changed from the most recent previous data set to a destination (block 110). The destination may include an administrative user 30 or application 32 authorized to view state information of the virtual machine, for example.

In one or more embodiments, the indication of which fields in the updated data set have changed in block 110 includes a most recent previous value for each field in the data set that has changed from the most recent previous data set. In such embodiments, the recipient of the transmission of block 110 can determine which portions of the data set of state information have changed, and can also determine what those changes are.

In one or more embodiments, the storing of block 108 includes the web server 24 storing not only the updated data set in the repository, but also storing an indication of which fields in the updated data set have changed from the most recent previous data set in the repository (e.g., storing each old value along with the updated value). Thus, if three values are updated, the updated data set and an indication of those three values could be stored in the database 28. The indication could include a listing of the three values (e.g., a variable or field name), copies of the previous values of those three updated values, or both, for example.

FIGS. 3A-B illustrate an example data set 40 of state information for a given VM 16. Although example data set 40 of FIGS. 3A-B includes both configuration data and metadata, it is understood that the inclusion of metadata is an optional feature. Also, it is understood that these are only examples of state information that may be included, and that various subcombinations of the state information may be used without including all of the state information listed in FIGS. 3A-B. Also, some information not displayed in FIGS. 3A-B may be used.

With this in mind, field 42 describes a quantity of Central Processing Units (CPUs) allocated to the VM, and field 44 describes a speed of each of those CPUs. Field 46 describes a quantity of VM server 12 memory allocated as Random Access Memory (RAM) for the VM 16. Fields 48-56 describe hard drive storage of the VM 16. Field 50 describes a mount point (e.g., a drive letter within the VM that a drive is mounted to), and field 52 describes a size of the mounted drive (e.g., 30 gigabytes). Field 54 describes whether the provisioning for the drive is "thick" or "thin." In the example of drive described by field 52, a "thick" provisioned drive would always occupy 30 GB of VM server 12 disk space, whereas a "thin" provisioned drive would occupy a smaller amount (e.g., 20 GB) which could grow as needed as the 30 GB is actually used. Field 56 describes a name of a disk image and a location of that disk image ("/Datastore1/MyVMDiscC.vmdk") used for the drive. In some instances, VM disk images are stored externally to a VM server 12, and the disk image location stores a network path indicating where the disk images are stored. As shown in FIGS. 3A-B, multiple hard drives may be mounted for a single VM.

Fields 58-64 describe other drives mounted in the VM, such as removable media drives (e.g., a CD drive, DVD drive, floppy disk drive, etc.). Field 60 describes a mount point for such a drive, field 62 describes a type of the drive (e.g., DVD-ROM), and field 64 describes a location of the disk image for that drive (e.g., a file name and network path to a disk image for the removable media drive). Although only a single "other drive" is shown in FIG. 58, it is understood that multiple ones could be used by a given VM. For example, multiple optical drives could be mounted.

Fields 66-74 describe each network to which the VM is connected. Field 68 describes a network interface used, field 70 describes a speed of the network, field 72 describes an Internet Protocol (IP) address of the network, and field 74 describes a name of the network. As shown in FIGS. 3A-B, multiple networks may be used by a single VM.

Field 76 describes an operational status of the VM (e.g., ON, OFF, or suspended).

Fields 78-86 describe a snapshot of the VM. Field 80 describes a name of the snapshot. Field 82 provides a description of the snapshot. Field 82 describes a date that the snapshot was created. Field 86 describes whether the snapshot includes RAM. Additional fields could be included to indicate when the snapshot was deleted.

Field 88 indicates which hypervisor manages the VM, and field 90 indicates which hypervisors are preferred hypervisors to manage the VM.

Fields 92-98 include metadata state information. Field 92 describes a name of the VM. Field 94 provides a description of the VM (e.g., what its intended use is). In one example, field 94 may be the "notes" field from the VCENTER product from VMWARE. Field 96 describes a guest operating system that runs on the VM, and field 98 describes a version of that VM's operating system.

Figure 4:
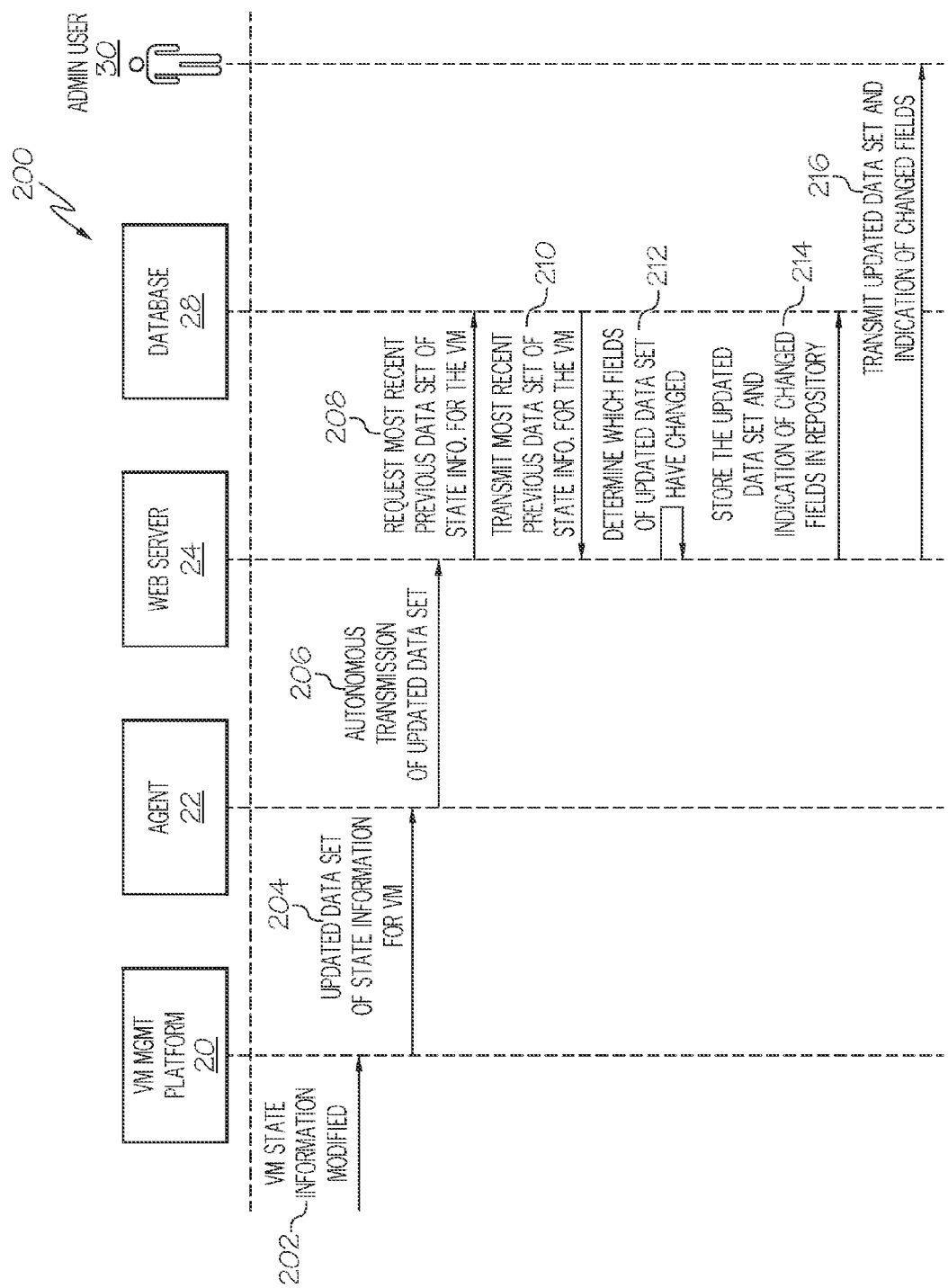
FIG. 4 is a signaling diagram illustrating one implementation of the method of FIG. 2.

FIG. 4 is a signaling diagram illustrating one implementation 200 of the method 100 of FIG. 2. The VM management platform 20 becomes aware that state information for a VM has been modified (202). For example, a greater amount of CPUs have been assigned to one of the VMs. The VM management platform 20 transmits an updated data set of state information for the VM to agent 22 (204). Based on receiving the updated state information for the VM, the agent 22 autonomously transmits the updated data set of state information to web server 24 (206) (e.g., without requiring polling by the web server 24). Based on the received notification, the web server 24 requests a most recent previous data set of state information for the VM from the repository of database 28 (208). As discussed above, the repository in database 28 includes previous data sets of state information for the VM. The database 28 transmits the most recent previous data set of state information for the VM to the web server 24 (210). In one or more embodiments the database 28 is locally stored within the web server 24 and the transmission occurs within the web server 24. In other embodiments, the database 28 resides outside of the web server 24, and the transmitting of 210 is a transmission between the hardware of the database (e.g., some other server) and the web server 24.

The web server 24 compares the updated state information to the most recent previous data set of state information to determine which values have changed (212). The web server 24 then stores both the updated data set and an indication of what fields have changed between the most recent previous data set and the updated data set in the repository (214). The web server 24 also transmits the updated data set and the same or another notification of what fields have changed to admin user 30 (216).

In one or more embodiments, the transmitting (of 110 and 216) is performed responsive to receipt of a state information request from the administrative user 30 or the application 32. In such embodiments, a notification may first be sent to the administrative user 30 or the application 32 to indicate that updated state information is available, and then the transmitting of 110 and 216 is only performed after the admin user 30 or application 32 submits a state information request to the web server 24 (e.g., through a web browser, desktop client, or mobile client). In one or more other embodiments, the transmitting of 110 and 216 is performed autonomously based on a state information subscription by the administrative user 30 or application 32. Also, although admin user 30 is shown as the recipient of the transmitting 216, it is understood that the application 32 could be an alternative (or additional) recipient.

Figure 5:
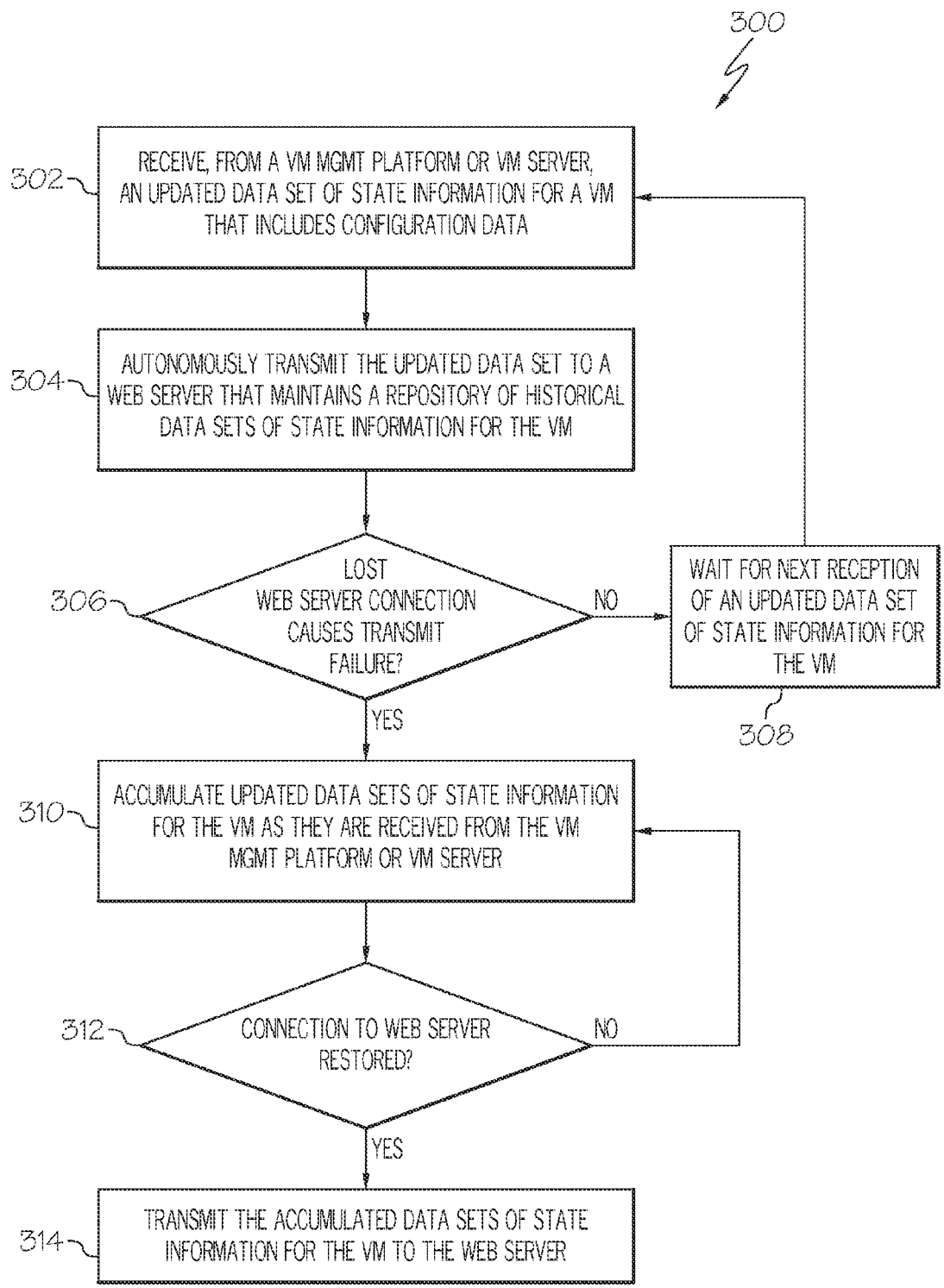
FIG. 5 illustrates another example method of handling virtual machine state information.

FIG. 5 illustrates an example method 300 of handling VM state information, which is implemented by agent 22. An updated data set of state information for a VM 16 is received from VM management platform 20 or VM server 12 (block 302). The state information includes configuration data for the VM 16, and optionally also includes metadata for the VM 16. The agent 22 autonomously transmits the updated data set to web server 24, which maintains a repository of historical data sets of state information for the VM 16 (block 304). The repository of historical data sets of state information includes previous data sets of state information for the VM 16. That the transmission of block 304 is autonomous indicates that no polling is required by the web server 24 to obtain the updated state information. Instead, the transmission occurs because updated state information is available and because the agent 22 knows that the web server 24 has subscribed to receive such data.

A check is performed to determine if a connection between the agent 22 and the web server 24 is lost causing the autonomous transmission of block 304 to fail (block 306). If no such failure occurs and the transmission of block 304 succeeds (a "no" to block 306), then the agent 22 waits for a next reception of an updated data set of state information for the VM 16 from the VM management platform 20 or VM server 12 (block 308). However, if the connection is lost causing the autonomous transmission of block 304 to fail (a "yes" to block 306), then the agent 22 accumulates updated data sets of state information for the VM 16 as they are received from the VM management platform 20 or VM server 12 (block 310). Until the connection is restored, the agent 22 continues to accumulate updated data sets as they are received. Once the connection between the agent 22 and web server 24 is restored (a "yes" to block 312), then the agent 22 transmits the accumulated data sets of state information for the VM 16 to the web server 24 (block 314). Thus, the method 300 introduces a "store-and-forward" feature into the system 10 of FIG. 1. The method of 300 can prevent loss of intermediate data sets of state information that could otherwise be lost without such a "store-and-forward" feature.

Figure 6:
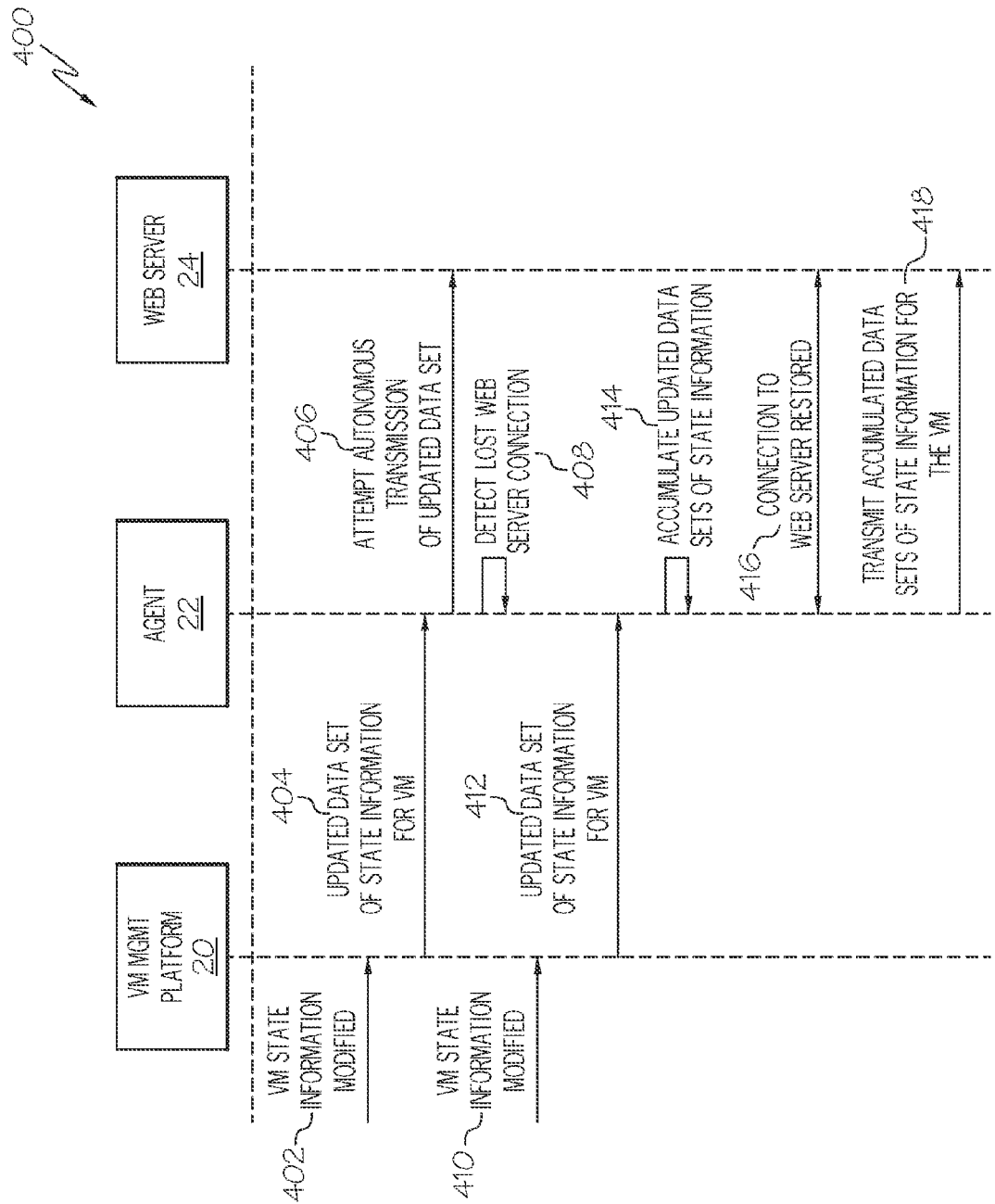
FIG. 6 is a signaling diagram illustrating one implementation of the method of FIG. 5.

FIG. 6 is a signaling diagram illustrating an example implementation 400 of the method 300 of FIG. 4. The VM management platform 20 becomes aware that state information for one of its virtual machines has been modified (402), and based on this transmits an updated data set of state information for the VM to agent 22 (404). Based on the received VM change notification, the agent 22 attempts to autonomously transmit the updated state information for the virtual machine to web server 24 (406). However, the agent 22 detects a lost web server connection has caused the attempted transmission to fail (408). This may be the result of the web server 24 restarting, or being temporarily offline for some other reason. After the state information for the VM is modified again (410), the agent 22 receives an additional data set of updated state information for the VM (412), and accumulates that additional data set with the previously received data set of state information of 404 (414). In one or more embodiments, the accumulation of 414 comprises the agent 22 creating a queue of data sets of state information, so that the accumulated data sets can be transmitted sequentially and/or with some other indication of the order in which they were received by the agent 22. Until the connection between the agent 22 and web server 24 is restored, steps 410-414 may be repeated as needed.

Once the connection between the agent 22 and web server 24 is restored (416), the agent transmits the accumulated data sets of state information to the web server 24 (418). As discussed above, this includes the data sets of both 404 and 412, and may include additional data sets if steps 410-414 are repeated while the connection is restored. The web server can then store the accumulated updated data sets of state information for the VM in database 28 (block 418). In one example, this includes performance of steps 208-214 (see FIG. 2) for each data set of state information, so that a complete record can be maintained in database 28 of each data set of state information (along with associated indications of what exactly changed in each data set).

Figure 7:
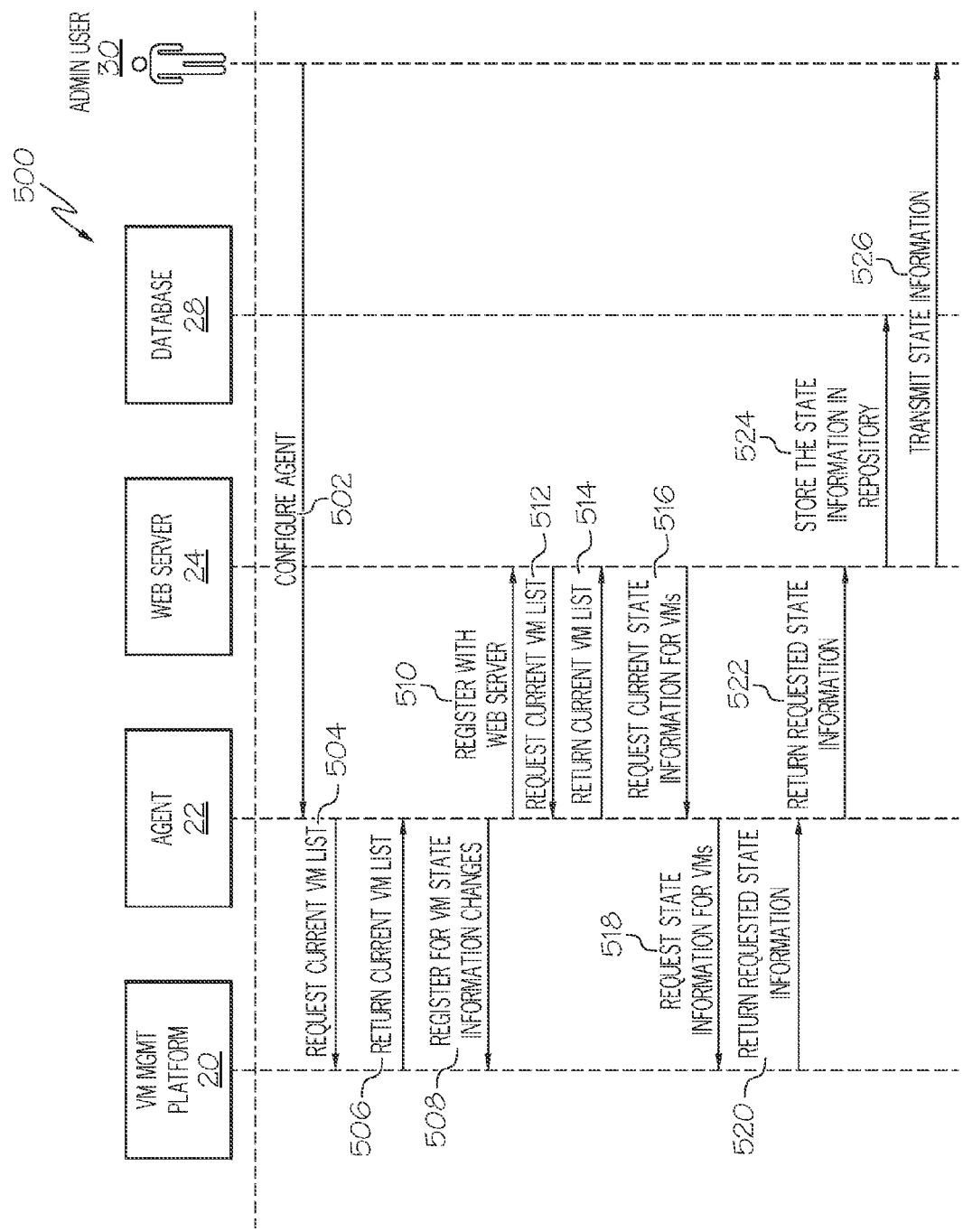
FIG. 7 is a signaling diagram illustrating an initialization process for the system of FIG. 1.

FIG. 7 is a signaling diagram illustrating an initialization process 500 for the system 10 of FIG. 1. The agent 22 is configured (502). The configuration may be performed by an admin user 30, for example. The configuration may include providing the agent 22 with credentials for accessing VM state information for certain VMs and/or providing the agent 22 with an indication which web server 24 it should communicate with (e.g., an IP address of the web server 24). For example, in an AWS scenario this could include configuring the agent 22 with a username and password, or some other credentials, of the admin user 30. The configuration may also include installing the agent 22 on a computing device operative to communicate with the VM management platform 20 (e.g., agent server 23).

Once configured, the agent 22 requests a current VM list from the VM management platform 20 (504). A current VM list is returned by the VM management platform (506), and the agent 22 registers for VM state information changes for the VMs in the list (508). The agent 22 then registers with web server 24 (510). The web server 24 requests a current VM list from the agent 22 (512), and the agent 22 returns the current VM list (514). The web server 24 then requests current state information for VMs managed by the VM management platform 20 as indicated in the returned current VM list from the agent 22 (516), and the agent 22 in turn requests the current state information for the VMs in the current VM list from the VM management platform 20 (518). Based on the request of 518, the agent 22 receives the requested VM state information from the VM management platform 20 (520), and transmits the state information to the web server 24 (522). The web server 24 stores the state information in its repository of historical state information for VMs in database 28 (524), and transmits the obtained state information to a destination, such as admin user 30 (or to application 32 which is authorized to view the state information) (526). In one or more embodiments, if the data set of state information of 522 was a first data set of state information for the VM 16, then the transmission of 526 could also include an indication that the previous values of the state information are null or nil. Also, although a single admin user 30 is shown in FIG. 7, it is understood that there could be a plurality of admin users 30, and it is further understood that the admin user 30 that configures the agent (502) may not be the same admin user 30 that receives the transmission of state information (526).

FIG. 8 is a signaling diagram illustrating a process 600 for handling a restart of the agent 22 or the web server 24. Either the agent 22 or web server 24 is restarted (602). The web server 24 requests a current VM list from the agent 22 (604), and the agent 22 returns the current VM list (606). The web server 24 requests current state information for the VMs in the current VM list (608), and the agent 22 in turn requests current state information for the VMs indicated in the request of 608 (610). Based on the request of 610, the agent 22 receives the requested VM state information from the VM management platform 20 (612), and transmits the state information to the web server 24 (614).

For the discussion below, assume that the returned state information in 614 includes an updated data set only for a single VM. The web server 24 requests a most recent previous data set of state information for the VM from the repository in database 28 (616). The database 28 transmits the most recent previous data set of state information for the VM to the web server 24 (618). As discussed above, in one or more embodiments the database 28 is locally stored within the web server 24 and the transmission therefore occurs within the web server 24. In other embodiments, the database 28 resides outside of the web server 24, and the transmitting of 618 is a transmission between the hardware of the database (e.g., some other server) and the web server 24.

The web server 24 compares the data set of state information of 614 to the most recent previous data set of state information to determine if any values have changed (620). If any of the fields have changed, then the web server 24 performs the following: store the latest set of state information and an indication of which fields have changed between the most recent previous data set and the updated data set in the repository (622); and transmit the updated data set and the same or another notification of the updated state information to admin user 30 or application 32 (624). Otherwise, if no fields have changed, the web server 24 does not need to update the database 28 and does not need to transmit the data set of state information to the admin user 30 (because it would have already been transmitted previously).

In one example, block 602 refers to a restart of the web server 24. In another example, block 602 refers to a restart of the agent 22 (e.g., if agent server 23 has to restart). FIG. 9 is a signaling diagram illustrating an example restart procedure 650 for the agent 22 (i.e., for implementing block 602 of FIG. 8). The agent 22 is restarted (652), and upon its restart requests a current VM list from the VM management platform 20 (654). A current VM list is returned by the VM management platform (656), and the agent 22 registers for VM state information changes for the VMs in the list (658). The agent 22 then notifies web server 24 that it has restarted (660), and the process 600 proceeds as described in FIG. 8. The procedure 650 of FIG. 9 assumes that the registration of step 510 (see FIG. 7) has already occurred.

Referring again to FIG. 6, in one example, the lost connection between the web server 24 and the agent 22 corresponds to the web server 24 restarting or going offline for a period of time. In such an example, the signaling of FIG. 8 (in particular 604-614) could be incorporated into FIG. 6.

Figure 10:
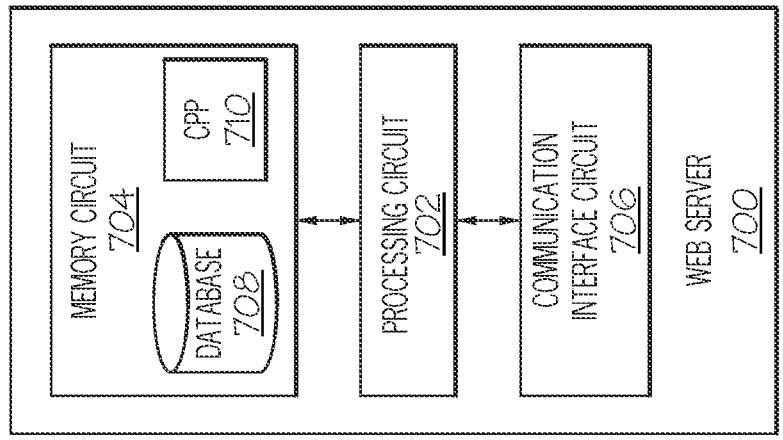
FIG. 10 illustrates an example web server of the system of FIG. 1.

FIG. 10 illustrates an example web server 700 that may be used as the web server 24 of FIG. 1. The web server 700 includes a processing circuit 702, memory circuit 704, and communication interface circuit 706. The processing circuit 702 is configured to receive, via the communication interface circuit 706, an autonomous transmission of an updated data set of state information for a VM, wherein the state information includes configuration data for the VM. The processing circuit 702 is configured to obtain a most recent previous data set of state information for the VM from a repository of historical data sets of state information for the VM. In some embodiments, the repository is stored in a database 308 that resides in memory circuit 704 and is collocated in the web server 700 with the other components 702, 706. In other embodiments, the database 708 is external to the web server 700 and is accessible via the communication interface circuit 706. The database 708 may be used as the database 28 of FIG. 1.

The processing circuit 702 is configured to determine which fields of the updated data set of state information have changed from the most recent previous data set of state information, and to store the updated data set in the repository of historical data sets. The processing circuit 702 is configured to transmit the updated data set of state information and an indication of which fields in the updated data set have changed from the most recent previous data set to a destination (e.g., an administrative user 30 or application 32 authorized to view state information of the VM). In one or more embodiments the communication interface circuit 706 includes a transceiver operable to communicate using one or more 802.11 standards.

In one or more embodiments, the memory circuit 704 includes a computer program product 710 that comprises computer readable program code stored on a computer readable storage medium (e.g., memory circuit 704) that configures the web server 700 to implement the techniques described above (e.g., method 100). For example, the computer program product 710 could be used to configure the processing circuit 702 to implement the application server 26 of FIG. 1.

Figure 11:
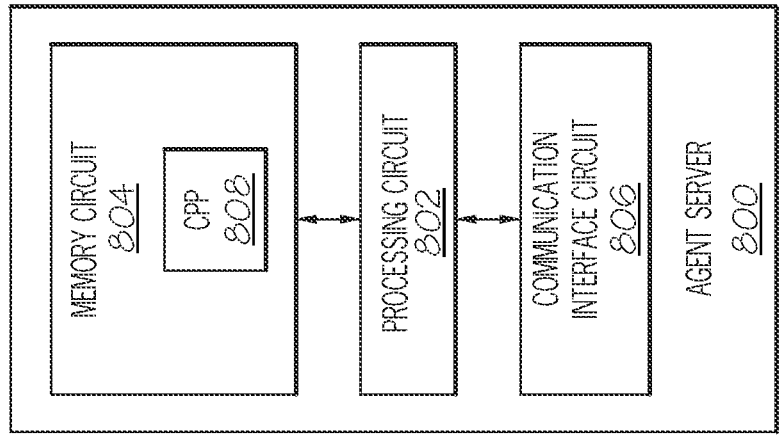
FIG. 11 illustrates an example agent server of the system of FIG. 1.

FIG. 11 illustrates an example agent server 800 that may be used as the agent server 23 of FIG. 1. The agent server 800 includes a processing circuit 802, a memory circuit 804, and a communication interface circuit 806. The processing circuit 802 is configured to receive, from a VM management platform 20 or VM server 12, an updated data set of state information for a VM, wherein the state information includes configuration data for the VM. The processing circuit 802 is also configured to autonomously transmit, via the communication interface circuit 806, the updated data set to a web server that maintains a repository of historical data sets of state information for the VM. The processing circuit 802 is further configured to, if a connection to the web server is lost and the autonomous transmission fails: accumulate updated data sets of state information for the VM as they are received from the VM management platform 20 or VM server 12; and transmit, via the communication interface circuit 806, the accumulated data sets of state information for the VM to the web server once the connection is restored. In one or more embodiments the communication interface circuit 806 includes a transceiver operable to communicate using one or more 802.11 standards.

In one or more embodiments, the memory circuit 804 includes a computer program product 808 that comprises computer readable program code stored on a computer readable storage medium (e.g., memory circuit 804) that configures the agent server 800 to implement the techniques described above (e.g., method 300).

As described above, the VMs 16 of an organization may need to be occasionally audited. This may be required for Sarbanes-Oxley (SOX) or for Payment Card Industry (PCI) compliance auditing, for example. For PCI compliance auditing, an auditor would be concerned with how sensitive information, such as credit card information, was handled by an organization. If VMs were used in connection with storing such information, the auditor would likely be interested to know what networks those VMs were used on (e.g., the state information of fields 66-74 of FIG. 3A). This state information could assist the auditor in determining if adequate security was maintained on networks upon which credit card information was available during an auditing period spanning months or years, for example.

Different types of state information may be useful for other auditors, such as SOX auditors. Consider the example of AWS, where AMAZON is a service provider, and an organization such as NETFLIX is tenant. If a tenant requests use of an additional VM or the use of additional resources for an existing VM, and that request triggers a billing adjustment, an auditor may wish to know when those changes were implemented to determine if billing was enacted at an appropriate time. For example, the tenant may wish to not commence billing for the extra resources those VM resources were actually provisioned. The SOX auditor may also be interested in determining that all appropriate controls are in place. For example, the SOX auditor may wish to trace all changes made to a tenant's VMs back to requests from those tenants, to ensure that unauthorized VM changes were not implemented.

The state information can also be useful in resolving disputes with a VM service provider (such as AWS). For example, if a critical VM went offline unexpectedly, the tenant may be very interested in determining how long that VM was offline, and/or if any changes to the VM preceded the change to being offline. These examples are also applicable to a scenario where there is no service provider/tenant relationship (e.g., in a large corporate network that uses many VMs).

Referring again to FIG. 1, different admin users 30 may have privileges to administer different VMs 16. For example, a first set of admin users may have privileges to administer a first set of VMs for an organization, and a second set of admin users may have privileges to administer a second set of VMs for an organization. For example, many admins may have access to non-sensitive VMs (e.g., front end web servers), but a smaller number of admin users may be granted access to VMs storing sensitive information (e.g., credit card data). The web server 24 may be configured to store state information for many VMs, but to only transmit state information for a given VM to those admin users and/or application 32 who have privileges to view state information for that VM.

In one or more embodiments, the agent 22 is configured to obtain state information from a plurality of VM management servers 18. This may be useful if the VM servers 12 reside at a plurality of sites, each of which uses a different VM management server 20 (e.g., one uses a VMWARE hypervisor, one uses a MICROSOFT hypervisor, etc.).

Although the VM management server 18 has been illustrated as being part of the system 10, it is understood that in some embodiments a VM server 12 may communicate directly with agent 22. This may be the case, for example, for smaller organizations that have a lower quantity of VMs and choose not to use a VM management platform 18. Also, in some embodiments (discussed in greater detail below), the agent 22 may be omitted. Thus, despite what is shown in the various figures discussed above, it is understood that the web server 24 may receive updated data sets of state information for a VM 16 from any of the following: a VM management platform 20, an agent 22 that is separate from but in communication with a VM management platform 20, and a VM server 12 that hosts VMs 16 but is not managed by a VM management platform 20.

Use of the agent server 23 can be useful in situations where the VM management platform 18 is behind a firewall. In such instances, the agent server 23 could also reside behind that same firewall to more easily facilitate communications between the VM servers 12 and the web server 24. In some embodiments, however, the agent server 23 and VM management server 18 may be one and the same, such that the agent 22 and VM management platform 20 are operated by the same server. In other embodiments, the agent 22 may be entirely omitted, such that the web server 24 receives state information for VMs directly from VM management platform 20 or a VM server 12.

The techniques above provide useful enhancements to the state information reporting features present in current VM applications. For example, various VMWARE products currently include a "callback" feature in which configuration data for a virtual machine can be obtained. However, this provides no indication of what state information in a data set of state information is new, and also does not provide any repository of historical state information for VMs. The techniques described above provide considerable improvements in this regard, and can more easily facilitate VM audits.

Some VM platforms have enabled users to use Application Programming Interfaces (APIs) to obtain VM state information (e.g., the "callback" functionality in VCENTER from VMWARE). However, no historical repository of state information was maintained. Also, implementing such callback functionality has been quite complex. The techniques described above address these limitations by maintaining a historical repository of data sets of state information, and by enabling users to easily transmit state information to desired destinations (e.g., applications 32), without requiring those applications to implement the callback functionality themselves.

Additionally, in the prior art of VMs, a primary focus has been on controlling hypervisors from the outside. The general idea was to force everyone to use a catalog or some other abstraction layer in front of the hypervisor, and restrict access to the hypervisor itself. The problem with this approach is that it assumes that the changes made through the abstraction layer work flawlessly every single time, and that no one will go to the hypervisor and make changes directly. This is not sufficient for compliance and auditing, because changes made at the hypervisor that bypass the abstraction layer could go undetected. The techniques described above resolve these deficiencies of prior art VM solutions, because the repository of historical state information for VMs gets updated regardless of how the state information for a given VM is changed (e.g., through an abstraction layer or directly at the hypervisor).

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   receiving, at an auditing web server configured to audit configuration data for virtual machines, an autonomous transmission of an updated data set of state information for a virtual machine, wherein the state information is received over a connection from an agent server, and includes configuration data for the virtual machine;
   responsive to receiving the autonomous transmission of the updated data set of state information, obtaining, by the auditing web server, a most recent previous data set of state information for the virtual machine from a repository comprising a plurality of historical data sets of state information for the virtual machine;
   comparing, by the auditing web server, the most recent previous data set of state information with the updated data set of state information;
   determining, by the auditing web server based on a result of the comparing, which fields of the updated data set of state information have changed from the most recent previous data set of state information;
   generating, at the auditing web server based on a result of the comparing, an indication of which fields in the updated data set have changed from the most recent previous data set;
   storing, by the auditing web server, both the updated data set and the indication of which fields in the updated data set have changed from the most recent previous data set in the repository in addition to the plurality of historical data sets that are already stored in the repository;
   transmitting, by the auditing web server, the updated data set of state information and the indication of which fields in the updated data set have changed from the most recent previous data set to a destination; and
   if the connection to the auditing web server is lost and the autonomously transmitting fails, receiving accumulated updated data sets of state information for the virtual machine from the agent server once the connection is restored, wherein the accumulated updated data sets of state information are accumulated in a queue created by the agent server such that the auditing web server receives the accumulated updated data sets of state information either sequentially or with an indication of an order in which the accumulated updated data sets of state information were received at the agent server from a virtual machine management platform or virtual machine server.

2. The computer-implemented method of claim 1, wherein the indication of which fields in the updated data set have changed includes a most recent previous value for each field in the data set that has changed from the most recent previous data set.

3. The computer-implemented method of claim 1, wherein the configuration data for the virtual machine includes a plurality of the following:
   a quantity of Central Processing Units (CPUs) allocated to the virtual machine;
   a speed of each CPU allocated to the virtual machine;
   a quantity of memory allocated as Random Access Memory (RAM) for the virtual machine;
   a quantity of storage allocated as a hard drive for the virtual machine;
   an indication of whether the hard drive for the virtual machine is thin provisioned or thick provisioned;
   an identifier that identifies a removable media drive mounted for the virtual machine;
   a name of a disk image for the virtual machine;
   a location of a disk image for the virtual machine;
   a list of each network to which the virtual machine is connected;
   an operational status of the virtual machine;
   a time and date that a snapshot of the virtual machine was taken or was deleted;
   an indication of which hypervisor manages the virtual machine; and
   an indication of which hypervisors are preferred hypervisors to manage the virtual machine.

4. The computer-implemented method of claim 1, wherein the state information also comprises metadata for the virtual machine that includes a name of the virtual machine, information identifying a guest operating system of the virtual machine, or a combination thereof.

5. The computer-implemented method of claim 1, wherein the transmitting is performed responsive to receipt of a state information request from the administrative user or the application.

6. The computer-implemented method of claim 1, wherein the transmitting is autonomously performed based on a state information subscription by the administrative user or the application.

7. The computer-implemented method of claim 1, further comprising:
registering the agent server at the auditing web server, wherein the agent server operatively connects the auditing web server to the virtual machine management server;
receiving, from the agent server:
a current list of virtual machines managed by a virtual machine management platform associated with the virtual machine management server; and
current state information for each virtual machine on the current list of virtual machines;
determining, at the auditing web server, that the current state information for a first virtual machine on the current list of virtual machines comprises initial configuration setting information for the first virtual machine; and
transmitting, from the auditing web server to the destination:
the current state information for the first virtual machine; and
an indication that values in the most recent previous data set of state information for the first virtual machine are null.

8. The computer-implemented method of claim 1 wherein receiving, at an auditing web server configured to audit configuration data for virtual machines, an autonomous transmission of an updated data set of state information for a virtual machine comprises the auditing web server autonomously receiving the updated data set of state information without transmitting a request for, or polling for, the updated data set of state information.

9. An auditing computer comprising:
a communication interface circuit configured to audit configuration data for virtual machines; and
a processing circuit configured to:
receive, via the communication interface circuit, an autonomous transmission of an updated data set of state information for a virtual machine, wherein the state information is received over a connection from an agent server, and includes configuration data for the virtual machine;
responsive to receiving the autonomous transmission of the updated data set of state information, obtain a most recent previous data set of state information for the virtual machine from a repository comprising a plurality of historical data sets of state information for the virtual machine;
compare the most recent previous data set of state information with the updated data set of state information;
determine, based on a result of the comparing, which fields of the updated data set of state information have changed from the most recent previous data set of state information;
generate, based on a result of the comparing, an indication of which fields in the updated data set have changed from the most recent previous data set;
store both the updated data set and the indication of which fields in the updated data set have changed from the most recent previous data set in the repository in addition to the plurality of historical data sets that are already stored in the repository;
transmit the updated data set of state information and the indication of which fields in the updated data set have changed from the most recent previous data set to a destination; and if the connection to the auditing computer is lost and the autonomous transmission fails, receive accumulated updated data sets of state information for the virtual machine from the agent server once the connection is restored, wherein the accumulated updated data sets of state information are accumulated in a queue created by the agent server such that the auditing computer receives the accumulated updated data sets of state information either sequentially or with an indication of an order in which the accumulated updated data sets of state information were received at the agent server from a virtual machine management platform or virtual machine server.

10. The computing device of claim 9, wherein the indication of which fields in the updated data set have changed includes a most recent previous value for each field in the data set that has changed from the most recent previous data set.

11. The computing device of claim 9, wherein the configuration data for the virtual machine includes a plurality of the following:
a quantity of Central Processing Units (CPUs) allocated to the virtual machine;
a speed of each CPU allocated to the virtual machine;
a quantity of memory allocated as Random Access Memory (RAM) for the virtual machine;
a quantity of storage allocated as a hard drive for the virtual machine;
an indication of whether the hard drive for the virtual machine is thin provisioned or thick provisioned;
an identifier that identifies a removable media drive mounted for the virtual machine;
a name of a disk image for the virtual machine;
a location of a disk image for the virtual machine;
a list of each network to which the virtual machine is connected;
an operational status of the virtual machine;
a time and date that a snapshot of the virtual machine was taken or was deleted;
an indication of which hypervisor manages the virtual machine; and
an indication of which hypervisors are preferred hypervisors to manage the virtual machine.

12. The computing device of claim 9, wherein the state information also comprises metadata for the virtual machine that includes a name of the virtual machine, information identifying a guest operating system of the virtual machine, or a combination thereof.

13. The computing device of claim 9, wherein the processing circuit is configured to transmit the updated data set of state information and indication of which fields have changed responsive to receipt of a state information request from the administrative user or the application.

14. The computing device of claim 9, wherein the processing circuit is configured to transmit the updated data set of state information and indication of which fields have changed autonomously based on a state information subscription by the administrative user or the application.

15. A computer program product comprising:
a non-transitory computer readable storage medium having computer readable program code embodied therewith, wherein the computer readable program code, when executed by a processing circuit of an auditing web server configured to audit configuration data for virtual machines, controls the processing circuit to:
receive, at the auditing web server, an autonomous transmission of an updated data set of state information for a virtual machine, wherein the state information is received over a connection from an agent server, and includes configuration data for the virtual machine;

responsive to receiving the autonomous transmission of the updated data set of state information, obtain a most recent previous data set of state information for the virtual machine from a repository comprising a plurality of historical data sets of state information for the virtual machine;

compare the most recent previous data set of state information with the updated data set of state information;

determine, based on a result of the comparing, which fields of the updated data set of state information have changed from the most recent previous data set of state information;

generate, based on a result of the comparing, an indication of which fields in the updated data set have changed from the most recent previous data set;

store both the updated data set and the indication of which fields in the updated data set have changed from the most recent previous data set in the repository in addition to the plurality of historical data sets that are already stored in the repository; and transmit the updated data set of state information and the indication of which fields in the updated data set have changed from the most recent previous data set to a destination; and if the connection to the auditing web server is lost and the autonomous transmission fails, receive accumulated updated data sets of state information for the virtual machine from the agent server once the connection is restored, wherein the accumulated updated data sets of state information are accumulated in a queue created by the agent server such that the auditing web server receives the accumulated updated data sets of state information either sequentially or with an indication of an order in which the accumulated updated data sets of state information were received at the agent server from a virtual machine management platform or virtual machine server.

16. The computer program product of claim 15, wherein the indication of which fields in the updated data set have changed includes a most recent previous value for each field in the data set that has changed from the most recent previous data set.

17. The computer program product of claim 15, wherein the configuration data for the virtual machine includes a plurality of the following:
- a quantity of Central Processing Units (CPUs) allocated to the virtual machine;
- a speed of each CPU allocated to the virtual machine;
- a quantity of memory allocated as Random Access Memory (RAM) for the virtual machine;
- a quantity of storage allocated as a hard drive for the virtual machine;
- an indication of whether the hard drive for the virtual machine is thin provisioned or thick provisioned;
- an identifier that identifies a removable media drive mounted for the virtual machine;
- a name of a disk image for the virtual machine;
- a location of a disk image for the virtual machine;
- a list of each network to which the virtual machine is connected;
- an operational status of the virtual machine;
- a time and date that a snapshot of the virtual machine was taken or was deleted;
- an indication of which hypervisor manages the virtual machine; and
- an indication of which hypervisors are preferred hypervisors to manage the virtual machine.

18. The computer program product of claim 15, wherein the state information also comprises metadata for the virtual machine that includes a name of the virtual machine, information identifying a guest operating system of the virtual machine, or a combination thereof.

19. The computer program product of claim 15, wherein the computer readable program code is further configured to control the processing circuit to transmit the updated data set of state information and indication of which fields have changed responsive to receipt of a state information request from the administrative user or the application.

20. The computer program product of claim 15, wherein the computer readable program code is further configured to control the processing circuit to transmit the updated data set of state information and indication of which fields have changed based on a state information subscription by the administrative user or the application.

* * * * *